(12) United States Patent
Dabak et al.

(10) Patent No.: US 11,353,347 B2
(45) Date of Patent: Jun. 7, 2022

(54) ULTRASONIC FLOW METER AND EXCITATION METHOD

(71) Applicant: Texas Instruments Incorporated, Dallas, TX (US)

(72) Inventors: Anand Dabak, Plano, TX (US); Luis Reynoso Covarrubias, Murphy, TX (US); Srinath Ramaswamy, Murphy, TX (US); Srinivas Lingam, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 972 days.

(21) Appl. No.: 15/708,553

(22) Filed: Sep. 19, 2017

(65) Prior Publication Data

US 2018/0274957 A1 Sep. 27, 2018

Related U.S. Application Data

(60) Provisional application No. 62/474,809, filed on Mar. 22, 2017.

(51) Int. Cl.
*G01F 1/66* (2022.01)
*G01F 15/02* (2006.01)
(Continued)

(52) U.S. Cl.
CPC .............. *G01F 1/667* (2013.01); *G01F 1/662* (2013.01); *G01F 15/024* (2013.01); *H04B 11/00* (2013.01); *G01F 1/668* (2013.01)

(58) Field of Classification Search
CPC ...... H04B 11/00; H04B 13/02; H04B 13/005; H04B 5/0031; H04B 7/0617; H04B 2001/6912; H04B 1/69; H04B 1/38
See application file for complete search history.

(56) References Cited

U.S. PATENT DOCUMENTS 3,780,577 A * 12/1973 Brown .................... G01F 1/667
73/861.28
5,817,949 A * 10/1998 Brown .................... G01F 1/663
73/861.28

(Continued)

OTHER PUBLICATIONS

"Ultrasonic Gas Meter Front End With MSP430 Reference Design", Texas Instruments, TI Designs: TIDM-1002, TIDUD03—Jun. 2017, 36 pgs.
(Continued)

*Primary Examiner* — Arleen M Vazquez
*Assistant Examiner* — Lynda Dinh
(74) *Attorney, Agent, or Firm* — Mark A. Valetti; Charles A. Brill; Frank D. Cimino

(57) ABSTRACT

Disclosed examples include methods and systems to measure fluid flow, including a transmit circuit to provide a transducer transmit signal based on a transmit pulse signal, a receive circuit to receive a transducer receive signal, an ADC to sample a receive signal from the receive circuit and provide a sampled signal, and a processing circuit that computes a transit time based on the sampled signal, and provides the transmit pulse signal including a first portion with a frequency in a first frequency band, and a second portion with a second frequency outside the first frequency band to mitigate undesired transducer vibration, where the second frequency is outside a transducer frequency bandwidth of the transducer.

20 Claims, 9 Drawing Sheets

(51) Int. Cl.
*H04B 11/00* (2006.01)
*G01F 1/667* (2022.01)

(56) References Cited

U.S. PATENT DOCUMENTS

| | | | |
|---|---|---|---|
| 9,664,816 B2 * | 5/2017 | Donderici | G01V 3/26 |
| 2009/0240453 A1 * | 9/2009 | Straub, Jr. | G01F 1/662 |
| | | | 702/79 |
| 2014/0012518 A1 | 1/2014 | Ramamurthy et al. | |
| 2014/0107950 A1 | 4/2014 | Dabak et al. | |
| 2014/0305215 A1 | 10/2014 | Dabak et al. | |
| 2015/0262569 A1 | 9/2015 | Dabak et al. | |
| 2015/0355001 A1 | 12/2015 | Dabak et al. | |
| 2016/0265349 A1 * | 9/2016 | Saulnier | H04L 25/0202 |
| 2017/0167904 A1 | 6/2017 | Sathyanarayana et al. | |

OTHER PUBLICATIONS

"SN74LVC2T45 Dual-Bit Dual-Supply Bus Transceiver With Configurable Voltage Translation", Texas Instruments, SN74LVC2T45, SCES516K-Dec. 2003-Revised Jun. 2017, 31 pgs.

"MSP430FR599x, MSP430FR596x Mixed-Signal Microcontrollers", Texas Instruments, MSP430FR5994, MSP430FR59941, MSP430FR5992, MSP430FR5964, MSP430FR5962, SLASE54B—Mar. 2016—Revised Jan. 2017, 169 pgs.

"TS5A9411 10-Ω 1:2 SPDT Analog Switch Single-Channel 2:1 Multiplexer and Demultiplexer", Texas Instruments, TS5A9411, SCDS2418—May 2008—Revised Dec. 2016, 24 pgs.

* cited by examiner

ULTRASONIC FLOW METER AND EXCITATION METHOD

REFERENCE TO RELATED APPLICATION

Under 35 U.S.C. § 119, this application claims priority to, and the benefit of, U.S. provisional patent application No. 62/474,809, entitled "END PULSE TUNING TO REDUCE DRIVER OVERSHOOT AND AVOID ESD TRIGGERS", and filed on Mar. 22, 2017, the entirety of which is hereby incorporated by reference.

BACKGROUND

Ultrasonic flow meters use a pair of ultrasonic transducers to measure fluid velocity in a pipe. The meter can be externally attached to a pipe or the transducers can be positioned inside the pipe. Interface circuitry determines time-of-flight (TOF) or transit times of ultrasonic signals transmitted from one transducer and received by the other transducer, and fluid velocity in the pipe is computed based on differential transit times between the two transducers. The fluid flow can be determined by multiplying the fluid velocity by the interior area of the pipe, and cumulative flow volume can be measured by integrating fluid flow over time. The interface circuit provides a transmit signal to one of the two transducers, and the other transducer generates a received signal based on propagation of the transmitted signal through the pipe. The transmit and receive connections are reversed and a measurement is obtained for transit time from a signal transmitted by the second transducer to the first transducer. For each transmitted signal, the transmit transducer is actuated by an electrical transmit signal, such as square pulses. At the end of the transmitted signal, the transmit transducer continues to vibrate, which can cause undesirable signal swings such as a large negative voltage for a ground referenced transmit transducer, and potentially activate protection circuitry in multiplexers used to switch the transducers between transmit and receive operation. Protection circuit triggering, in turn, can generate signal swings and the interface receiver signal conditioning circuitry. The undesired signal noise, moreover, may take a significant amount of time to decay, and may interfere with the received ultrasound signal causing meter inaccuracies or malfunctions. A Schottky diode can be used to clamp the negative voltage at the multiplexer, but this approach can cause impedance mismatch between the transmitter and receiver.

SUMMARY

Disclosed examples include techniques and apparatus for fluid flow measurement using ultrasonic signals methods and systems to measure fluid flow. Example flow measurement systems include two or more transducers and an interface circuit. A transmit circuit provides a transducer transmit signal based on a transmit pulse signal, and a receive circuit receives a transducer receive signal. The interface circuit in certain examples includes a switching circuit that connects the transmit circuit output to a first transducer and connects the receive circuit input to a second transducer in a first state, and reverses the transducer connections in a second state. For the forward and reverse connection states (e.g., upstream and downstream), the transmit circuit provides a transducer transmit signal, and an analog-to-digital converter (ADC) samples a receive signal from the receive circuit and provides a sampled signal. The system includes a processing circuit that computes a transit time based on the sampled signal, and provides the transmit pulse signal to the transmit circuit. The processing circuit provides the transmit pulse signal including a first portion with a frequency in a first frequency band. The transmit pulse signal includes a second portion with a second frequency outside the first frequency band to mitigate undesired transducer vibration.

DETAILED DESCRIPTION

Figure 1:
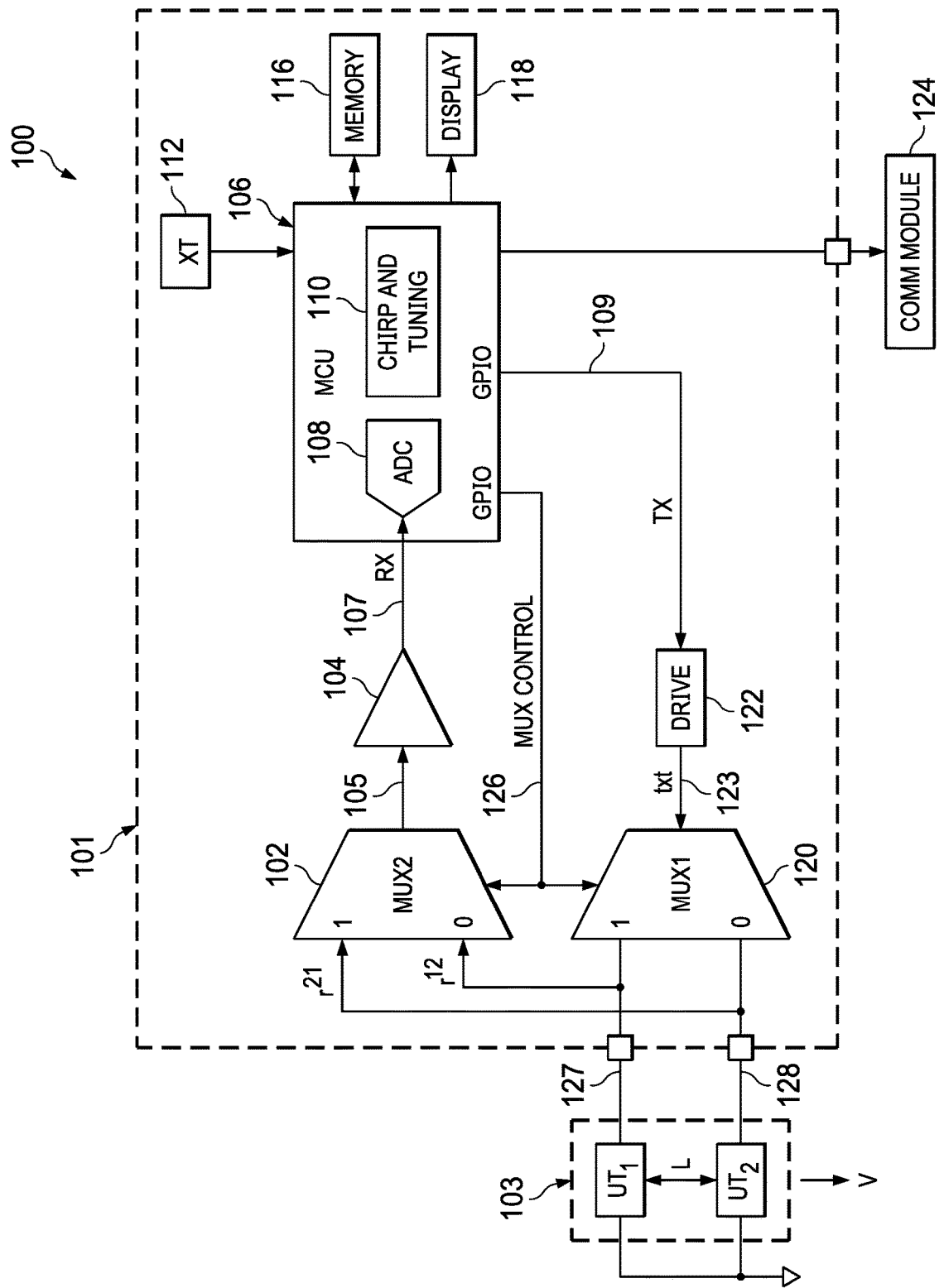
FIG. 1 is a schematic diagram of an ultrasonic flow sensing system.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections. Disclosed examples provide fluid measurement systems and methodologies which can be used in measuring flow of fluids (e.g., gases, liquids) within a structure, and are illustrated and described below in connection with fluid flow in a pipe. Ultrasonic transducers are used for transmitting and receiving ultrasonic signals and interface circuitry generates the transmit signals and processes the received signals to assess signal transit time (e.g., time-of-flight) of the signals through the measured fluidic medium to compute fluid velocity and associated fluid flow parameters. The disclosed techniques and apparatus can be used in any fluid flow applications, such as gas metering, etc. The disclosed examples, moreover, provide intelligent transmit signal generation to mitigate or avoid undesired transducer vibration and resulting signal disturbances at the end of a transmit signal portion to provide a solution to the above disadvantages.

Figure 2:
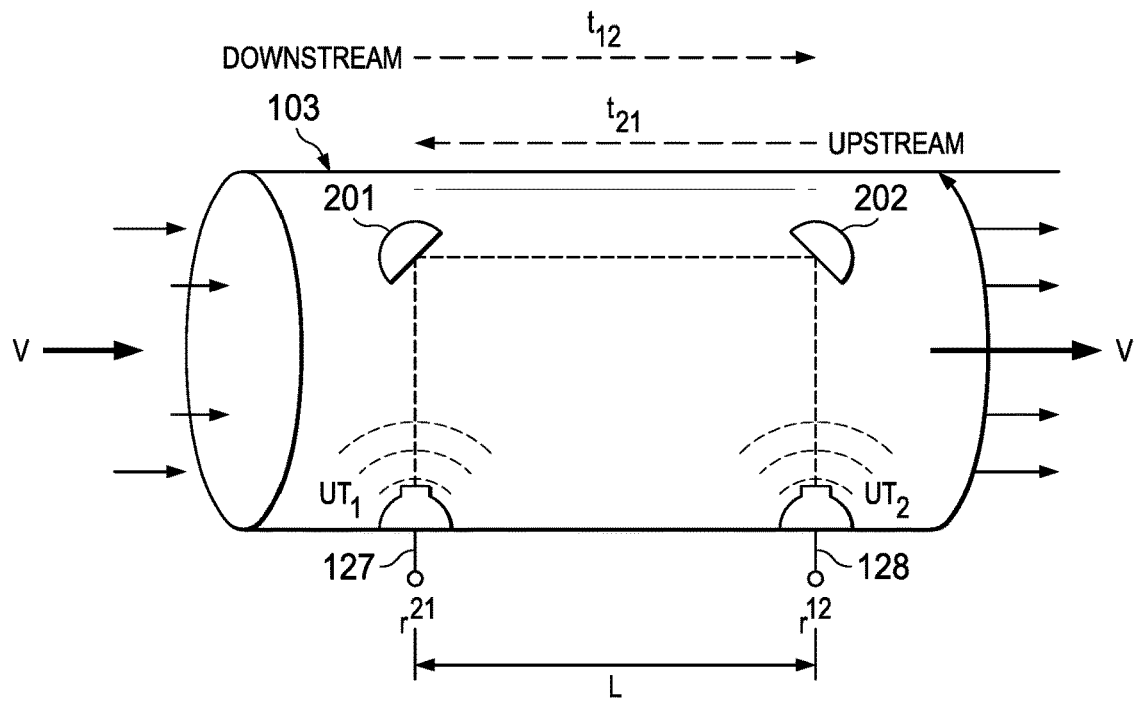
FIG. 2 is a simplified side view of a pipe with an example configuration of ultrasonic transducers for sensing fluid flow.
Figure 3:
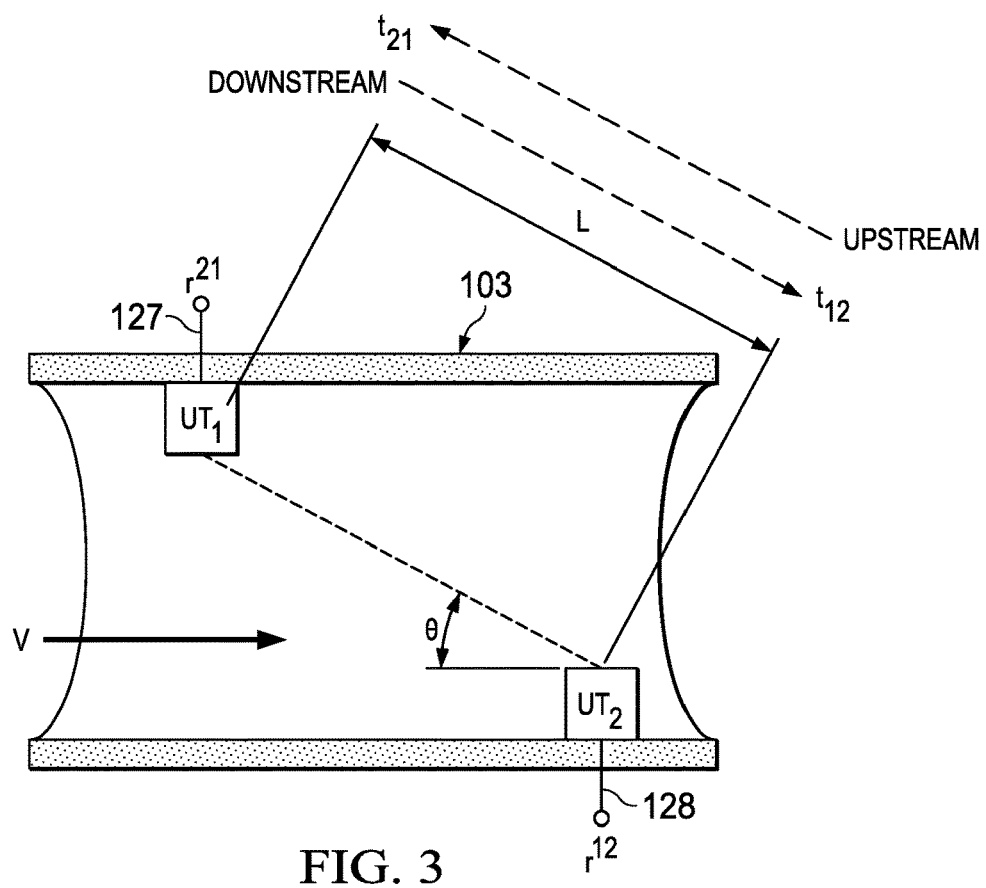
FIG. 3 is a simplified side view of a pipe with another example configuration of ultrasonic transducers for sensing fluid flow.

Referring initially to FIGS. 1-3, FIG. 1 shows a system 100 for measuring fluid flow, including a flow sensor interface circuit 101 and first and second ultrasonic transducers $UT_1$ and $UT_2$ operatively associated with a pipe 103. The transducers $UT_1$ and $UT_2$ are spaced from one another by a distance L and operate to transmit and receive ultrasonic signals at least partially along a fluid flow path of fluid flowing through the pipe 103. FIG. 2 illustrates one possible transducer configuration, with the transducers $UT_1$ and $UT_2$ mounted to deliver and/or receive ultrasonic signals transverse or perpendicular to the direction of the fluid velocity V in the pipe 103. A pair of ultrasonic reflector structures 201 and 202 are positioned to redirect signals to or from the transducers $UT_1$ and $UT_2$ in a direction generally parallel to the fluid flow direction within the pipe 103, and the effective spacing of the transducers and the associated reflector structures is illustrated as a length distance L. FIG. 3 illustrates another non-limiting example in which the transducers $UT_1$ and $UT_2$ are positioned on generally opposite sides of the pipe 103, and the signal transmission path between the transducers is at an angle θ to the axial direction of the pipe 103. In this configuration, the effective transducer spacing L is illustrated at the angle θ. In both examples, the first transducer $UT_1$ includes a first electrical terminal 127 and the second transducer $UT_2$ includes a second electrical terminal 128 to provide electrical connection to connectors or terminals of the flow sensor interface circuit 101 in FIG. 1. The transducers $UT_1$ and $UT_2$ have second terminals connected to a reference voltage node, such as a cable shield common or ground reference in the example of FIG. 1.

The flow sensor interface circuit 101 example in FIG. 1 includes a receive circuit with a receive circuit input 105 that receives a transducer receive signal $r^{21}$, $r^{12}$ from a connected one of the electrical terminals 127, 128 through a switching circuit. In the illustrated example, the receive circuit input 105 delivers the receive signal to an amplifier circuit 104 with an output 107 that provides a receive signal RX to a processing circuit 106. In one example, the amplifier circuit 104 includes an OPA836 amplifier that receives the signal $r^{21}$, $r^{12}$ from the connected transducer, followed by an OPA835 that provides the RX signal to the processing circuit 106 via the output 107. The processing circuit 106 can be any suitable processor, microcontroller, etc. In the illustrated example, the processing circuit 106 includes an analog-to-digital converter (ADC) 108 with an input connected to the receive circuit output 107. The ADC 108 is arranged to sample the receive signal RX from the receive circuit amplifier 104 and to provide a sampled signal for use in flow sensing. In the illustrated example, the ADC 108 is part of the processing circuit 106. In other examples, a separate ADC can be used. In one example, the processing circuit 106 is a FR5994 MCU available from Texas Instruments, Inc. of Dallas Tex. including an on-board ADC 108.

As discussed further below, the processing circuit 106 includes a chirp and tuning component or circuit 110 that generates a transmit pulse signal TX. The processing circuit 106 operates according to clock signals from a crystal oscillator circuit 112. In one example, the crystal oscillator circuit 112 (XT) controls measurement times, and excitation and sampling frequencies. The processing circuit 106 in one example implements program instructions from a connected memory 116 to implement automated fluid flow measurement functions and signal generation functions as described herein. The chirp and timing component 110 can be implemented as processor-executed instructions and/or as fixed or programmable hardware circuitry in certain implementations. The processing circuit 106 stores sample data from the ADC 108 and computed values in the memory 116 in certain examples. The memory 116 can be internal to the processing circuit 106 or can be a separate memory as shown in the example of FIG. 1. The example interface circuit 101 also includes a display or other user interface 118, for example, to receive programming instructions or commands from a user and to render computed values or information to a user (e.g., computed fluid flow rates, velocity, or other monitored or computed values). The illustrated processing circuit example 106 also includes a communication interface, for example, a serial data connection to exchanged data with a communications module 124 or other external system.

The interface circuit 101 also includes a transmit circuit with a transmit circuit output 123 that provides a transducer transmit signal txt through the switching circuit to a connected one of the transducer electrical terminals 127, 128. In the illustrated example, the transmit circuit includes a drive circuit 122, such as an amplifier stage with level shifting and/or isolation circuitry, although not required for all possible implementations of the disclosed concepts. In one example, the processing circuit 106 includes a general purpose I/O (GPIO) output 109 that provides or delivers the TX signal to the input of the drive circuit 122. The drive circuit 122 provides the transducer transmit signal txt to the transmit circuit output 123 for delivery through the switching circuit to the connected transducer electrical terminal 127 or 128 based on the transmit pulse signal TX from the processing circuit output 109.

The switching circuit in one example includes a first switching circuit or multiplexer 120 (labeled MUX1 in FIG. 1) associated with the transmit circuit, and a second switching circuit or multiplexer 102 (MUX2) associated with the receive circuit. Other switching circuitry can be used beyond the illustrated multiplexer example. In operation, the switching circuit operates in a first state (DOWNSTREAM in FIGS. 2 and 3) and a second state (UPSTREAM in FIGS. 2 and 3) for measuring transit times of ultrasonic signals traveling between the transducers $UT_1$ and $UT_2$. The multiplexers 120 and 102 in one example are TS5A9411DCKR multiplexers available from Texas Instruments, Inc. of Dallas Tex., and include on-board ESD protection circuitry. In the illustrated example, the processing circuit 106 includes a second GPIO output 126 that provides a single switching control signal MUX CONTROL to both the multiplexers 102 and 120. In other examples, the processing circuit 106 provides separate control signals to operate the multiplexers 102 and 120. In the first or DOWNSTREAM state, the transmit multiplexer 120 connects the transmit circuit output 123 to the first electrical terminal 127 of the first transducer $UT_1$, and the receive multiplexer 102 connects the receive circuit input 105 to the second electrical terminal 128 of the second transducer $UT_2$. This configuration provides the transducer transmit signal txt to the first transducer $UT_1$, and connects the receive circuit to receive a signal $r^{21}$ from the second transducer $UT_2$. The received signal $r^{21}$ in this state represents the ultrasonic signal received at the second transducer $UT_2$ in response to transmission of the TXT signal by the first transducer $UT_1$ in the first state. To implement the second state (UPSTREAM), the processing circuit 106 changes the MUX CONTROL signal to connect the transmit circuit output 123 to the second electrical terminal 128 of the second transducer $UT_2$ via the transmit multiplexer 120, and to connect the receive circuit input 105 to the first electrical terminal 127 of the first transducer $UT_1$ via the receive multiplexer 102.

As discussed further below in connection with FIGS. 6-8, the processing circuit 106 advantageously generates and provides the transmit pulse signal TX to the transmit circuit 122 using a pulse generator feature of the GPIO output 109 to provide a transmit pulse signal TX that includes a first portion and a second portion. The first portion has a frequency in a first frequency band $f_0$-$f_1$, and the second portion has a second frequency $f_2$ outside the first frequency band $f_0$-$f_1$. In this regard, abruptly stopping the transmit pulse signal TX and the corresponding transducer transmit signal txt in a first frequency band $f_0$-$f_1$ can cause a negative voltage at the electrical terminal of the grounded transmit transducer $UT_1$ or $UT_2$, leading to undesirable triggering of the ESD protection circuitry of the transmit multiplexer 120. This triggering, in turn, can cause a disturbance in the receive circuit and saturate the amplifier circuit 104. The amplifier circuit may take a significant amount of time to recover, and this receive circuit disturbance can interfere with the received ultrasound signal causing flow sensor system inaccuracies or malfunctions. As previously mentioned, using a Schottky diode to clamp the negative voltage at the multiplexer 120 can cause impedance mismatch between the transmitter and receiver.

Figure 10:
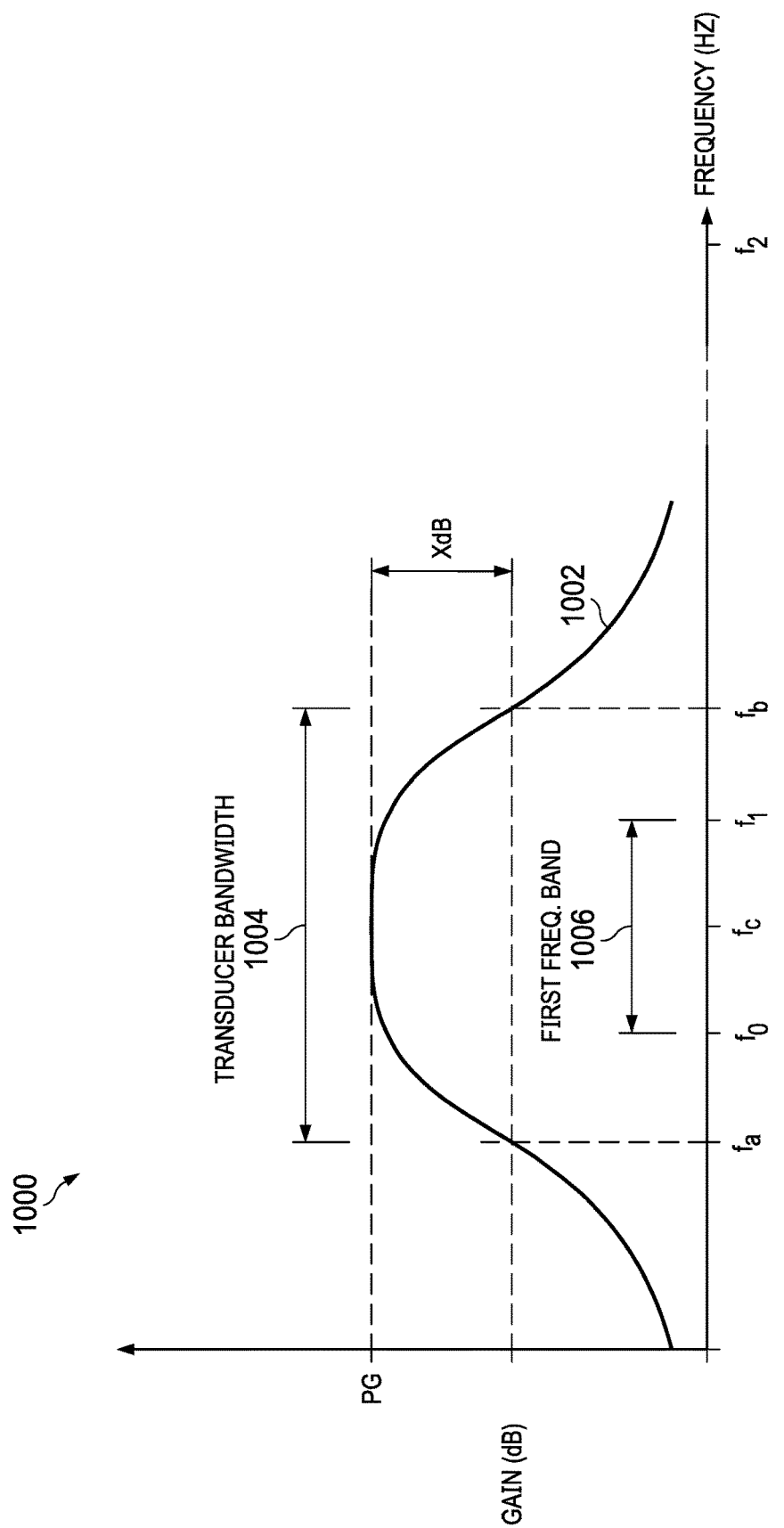
FIG. 10 is an example transducer response graph showing an example transducer frequency bandwidth.

The illustrated processing circuit 106 provides a solution by generating the transmit pulse signal TX that includes the second portion with a second frequency $f_2$ outside the first frequency band $f_0$-$f_1$ to dampen the mechanical vibration of the transmit transducer and prevent large negative voltage swings and false ESD protection circuit triggering in the transmit multiplexer 120. In certain examples, the first frequency band $f_0$-$f_1$ is inside a frequency bandwidth of the transducers $UT_1$ and $UT_2$ and the second frequency $f_2$ is outside the frequency bandwidth of the transducers $UT_1$ and $UT_2$. As shown in FIG. 10 below, the transducer bandwidth is the range of excitation frequencies for which the transmitting transducer gain response is within a non-zero predetermined value of the peak transducer response, such as within 10 dB of the peak response. In certain examples, the first portion includes a frequency ramp, with a frequency that ramps up from a starting frequency in the first frequency band to a higher end frequency in the first frequency band, and the second frequency of the second portion is different from the end frequency. This transmit pulse signal is thus different from a simple ramp, and the second frequency in the second portion in certain examples is significantly higher than the first frequency band. In other examples, the second frequency is below the first frequency band. Using a second frequency significantly higher than the first frequency band advantageously facilitates quicker response in dampening mechanical vibration or oscillations of the transmit transducer, whereas using a second frequency below the first frequency band takes more time to dampen the transmit transducer vibration. In certain examples, moreover, the frequency of the first portion is constant. In certain examples, the second frequency of the second portion is constant, whether the first portion is a different constant frequency or a ramp. In certain examples, moreover, the first portion has a duration significantly longer than the duration of the second portion. For example, the first portion in certain examples has a duration greater than twice the duration of the second portion.

Figure 4:
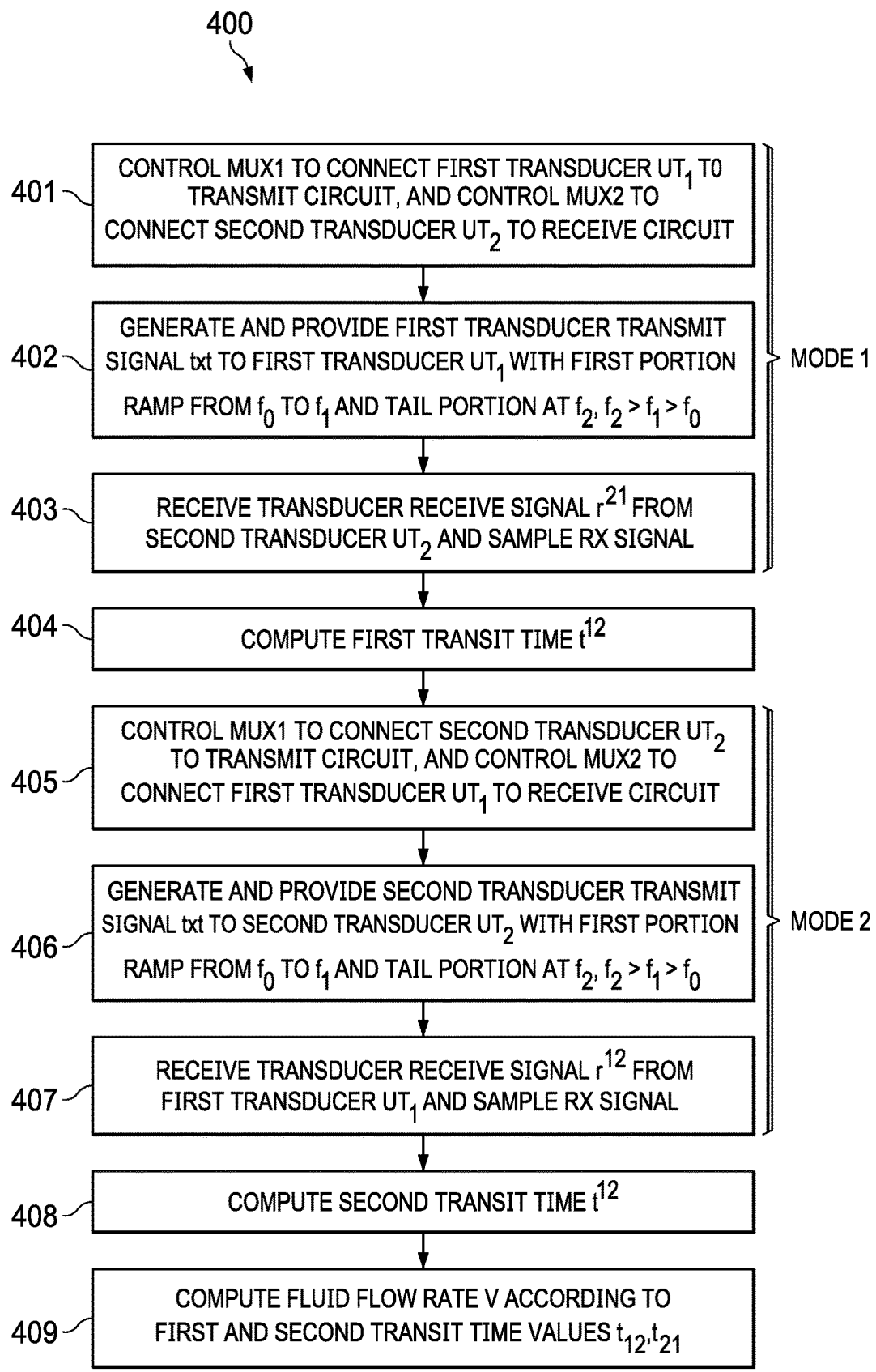
FIG. 4 is a flow diagram of a method for operating an ultrasonic flow sensing system.
Figure 5:
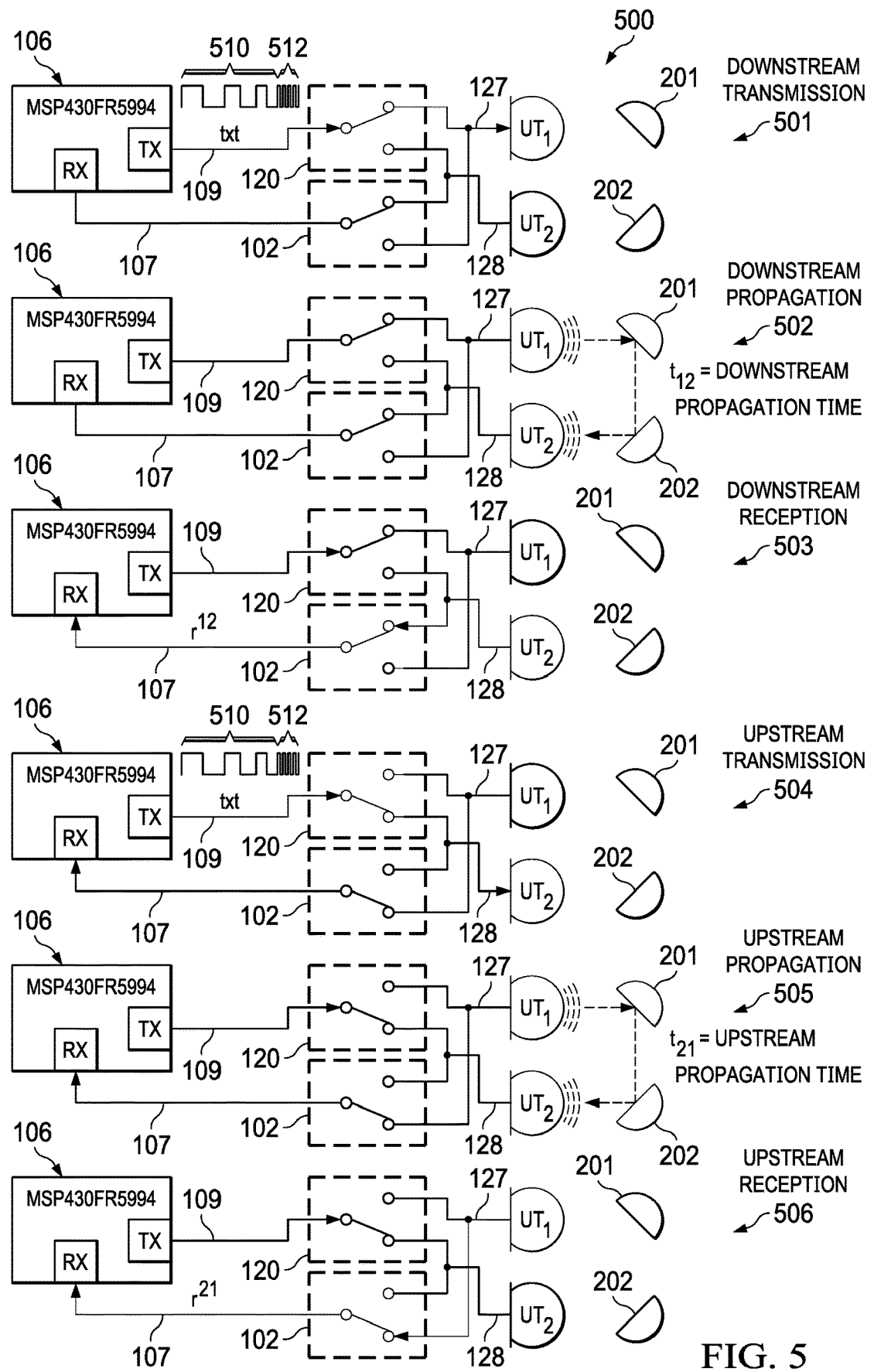
FIG. 5 is a sequence diagram of an ultrasonic flow sensing measurement sequence.

Referring also to FIGS. 4 and 5, FIG. 4 illustrates an example method 400 to operate an ultrasonic flow sensing system, including operation in a first mode (labeled MODE 1 in FIG. 4) and a second mode (MODE 2) to obtain downstream and upstream measurements of ultrasonic signal transit times to facilitate computation of fluid velocity or other values representing fluidic flow in a pipe 103. FIG. 5 illustrates a sequence diagram 500 that shows an ultrasonic flow sensing measurement sequence including sequence portions 501, 502 and 503 in the first mode as well as sequence portions 504, 505 and 506 in the second mode. The method 400 in one example is implemented by the processing circuit 106 of the interface circuit 101 in conjunction with connected ultrasonic transducers $UT_1$ and $UT_2$ in the system 100 of FIG. 1. The method 400 begins for an example 2-mode measurement sequence at 401, where the processing circuit 106 provides the switching control signal MUX CONTROL at the GPIO output 126 to set the switching circuit 102, 120 to the first state. This connects the transmit circuit to the first transducer $UT_1$ and connects the second transducer $UT_2$ to the receive circuit, as shown in the first sequence portion 501 of FIG. 5.

At 402 in FIG. 4, the processing circuit 106 provides the first transducer transmit signal txt to the first transducer (e.g., $UT_1$). This includes generating a transmit pulse signal TX at the GPIO output 109 to cause the transmit drive circuit 122 to deliver a corresponding transducer transmit signal txt to the first transducer electrical terminal 127 via the transmit circuit output 123 and the multiplexer 120. This causes the first transducer $UT_1$ to emit an ultrasonic signal in the fluid in the pipe 103 while the switching circuit 102, 120 is in the first state. The first sequence portion 501 in FIG. 5 shows one example in which the first transducer transmit signal txt includes a first portion 510 with a frequency in a first frequency band $f_0$-$f_1$, and a second portion 512 with a second frequency $f_2$ outside the first frequency band $f_0$-$f_1$. In one example, the first portion 510 is a ramp from the starting frequency $f_0$ to the end frequency $f_1$, and the second frequency $f_2$ is significantly higher than the first frequency band $f_0$-$f_1$. Moreover, in the example shown in FIG. 5, the duration of the first portion 510 is significantly longer than the duration of the second portion 512.

At 403 in FIG. 4, the receive transducer receives a first transducer receive signal (e.g., $r^{21}$) from the second transducer $UT_2$. Also at 403, the ADC 108 of the processing circuit 106 samples the receive signal RX from the receive circuit amplifier 104 and provides a sampled signal to generate a first sampled signal. The second sequence portion 502 in FIG. 5 shows downstream propagation of the ultrasonic transmit signal from the first transducer $UT_1$ to the second transducer $UT_2$ through the fluid in the pipe 103, which takes a first transit time $t_{12}$. The third sequence portion 503 in FIG. 5 illustrates reception of the received signal for the downstream measurement in the first mode 1. The second transducer $UT_2$ receives the ultrasonic signal delayed by the downstream transit time $t_{12}$ (FIGS. 2 and 3). In response, the second transducer $UT_2$ generates and delivers the received signal $r^{21}$ to the receive circuit input 105 through the multiplexer 102 while the switching circuit 102, 120 is in the first state. The ADC 108 samples and converts the corresponding receive signal RX from the receive circuit amplifier 104 and provides a sampled signal for use in flow sensing. The processing circuit 106 in one example stores the corresponding sampled signal as a series of digital values in the memory 116.

At 404 in FIG. 1, the processing circuit 106 computes the first transit time $t_{12}$ that represents transit of ultrasonic signals from the first transducer $UT_1$ to the second transducer $UT_2$ based on the first sampled signal.

At 405-407 in FIG. 4, the processing circuit (106) reverses the multiplexer circuit connections to the second state via the MUX CONTROL signal to implement the second mode 2, as illustrated in the sequence portions 504-506 of FIG. 5. At 405 in FIG. 4, the processing circuit 106 provides the switching control signal MUX CONTROL at the GPIO output 126 to set the switching circuit 102, 120 to the second state. This connects the transmit circuit to the second transducer $UT_2$ via the MUX 120 and connects the first transducer $UT_1$ to the receive circuit via the MUX 102 as shown in the fourth sequence portion 504 of FIG. 5. At 406 in FIG. 4, the processing circuit 106 generates a second transmit pulse signal TX at the GPIO output 109. The transmit circuit and the multiplexer 120 generate and deliver the corresponding second transducer transmit signal txt to the second electrical terminal 128 of the second transducer $UT_2$ while the switching circuit 102, 120 is in the upstream second state. As shown in the fourth sequence portion 504 in FIG. 5, the transmit drive circuit 122 in this example provides the second transducer transmit signal txt to the second transducer $UT_2$ including the first portion 510 with the frequency in the first frequency band $f_0$-$f_1$, and the second portion 512 with the second frequency $f_2$ outside the first frequency band $f_0$-$f_1$. In the illustrated example, the first portion 510 of the second transducer transmit signal txt is a ramp from the starting frequency $f_0$ to the end frequency $f_1$, and the second frequency $f_2$ is significantly higher than the first frequency band $f_0$-$f_1$. The duration of the first portion 510 is significantly longer than the duration of the second portion 512. The fifth sequence portion 505 in FIG. 5 shows upstream propagation of the ultrasonic transmit signal from the second transducer $UT_2$ to the first transducer $UT_1$ through the fluid in the pipe 103, which takes a second transit time $t_{21}$. The sixth sequence portion 506 in FIG. 5 illustrates reception of the second received signal for the upstream measurement in the second mode 2.

At 407 in FIG. 4, the first transducer $UT_1$ receives the second upstream ultrasonic signal delayed by the downstream transit time $t_{21}$, and in response generates and delivers the second received signal $r^{12}$ to the receive circuit input 105 through the multiplexer 102 while the switching circuit 102, 120 is in the second state. Also at 407, the ADC 108 samples and converts the corresponding receive signal RX from the receive circuit amplifier 104 and provides a sampled signal that is stored in the memory 116.

At 408 in FIG. 1, the processing circuit 106 computes the second transit time $t_{21}$ that represents transit of the ultrasonic signals from the second transducer $UT_2$ to the first transducer $UT_1$ based on the second sampled signal 408. The processing circuit 106 computes the second transit time $t_{21}$, and computes a fluid flowrate or velocity V at 409 according to the first and second transit time values $t_{12}$ and $t_{21}$. In certain implementations, the processing circuit 106 repeats the illustrated process 400 for each of a number of dual-mode measurement sequences, and can report the resulting computed values (e.g., velocity V) to a host system at a predetermined interval. Moreover, the interface circuit 101 can be configured for low-power operation in certain field installations to implement a low-power "sleep" mode, and periodically wake up to implement the dual-mode measurement sequence shown in FIG. 4, and then resume the low-power operation.

In one example, the processing circuit 106 computes the transit times $t_{12}$, $t_{21}$ of the ultrasonic signals travelling between the first and second transducers $UT_1$, $UT_2$ based on the sampled signals from the first and second measurements. In this regard, for sinusoidal transmit signals in the configuration of FIG. 2, the receive signal $r^{12}$ can be represented as $r^{12}=f(t)\sin(2\pi f_C t)$, and the second receive signal $r^{21}$ is given as $r^{21}=f(t+\delta t)\sin(2\pi f_C(t+\delta t))$, where $f_C$ is the center frequency of the transmitting transducer and f(t) is the envelope of the received signal. The processing circuit 106 in one example determines the transit times $t_{21}$ and $t_{12}$ from the first and second measurements. Using these, the processing circuit 106 computes the velocity V of the fluid in the pipe 103 as $V=(L/2)*(t_{21}-t_{12})/(t_{21}*t_{12})$ based on the relationships $t_{12}=L/(C+V)$ and $t_{21}=L/(C-V)$, where C is the velocity of the ultrasonic signal in the fluid. The velocity C can vary as a function of temperature, and a temperature sensor may or may not be included based on the target cost of the measurement system 100. By measuring two different propagation times (e.g., $t_{12}$ and $t_{21}$) the thermal variability of the ultrasonic velocity C is canceled. In the off-axis configuration of FIG. 3, the processing circuit 106 computes the transit times as $t_{12}=L/(C+V\cos(\theta))$ and $t_{21}=L/(C-V\cos(\theta))$, where $\theta$ is the angle in FIG. 3. In this case, the processing circuit 106 again computes the fluid velocity as $V=(L/2)*(t_{21}-t_{12})/(t_{21}*t_{12})$. The velocity in one example is displayed on the display 118 and can be provided to an external system (not shown) via the communications module 124 (FIG. 1).

Figure 6:
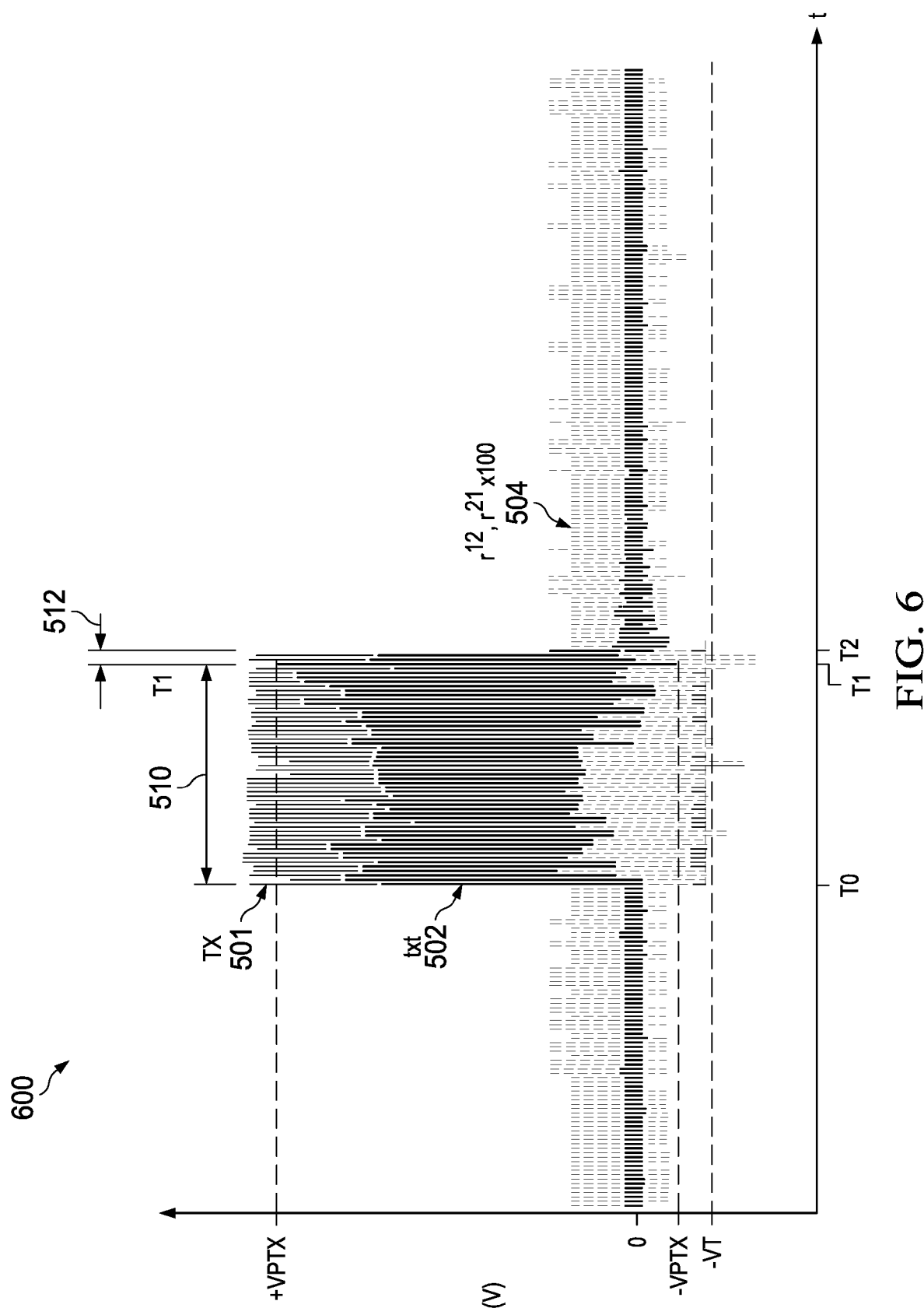
FIG. 6 is a signal diagram of example transmit and receive signals including an out-of-band transmit tuning sequence in a tail or end portion of an example upstream or downstream measurement cycle in an ultrasonic flow sensing system.
Figure 7:
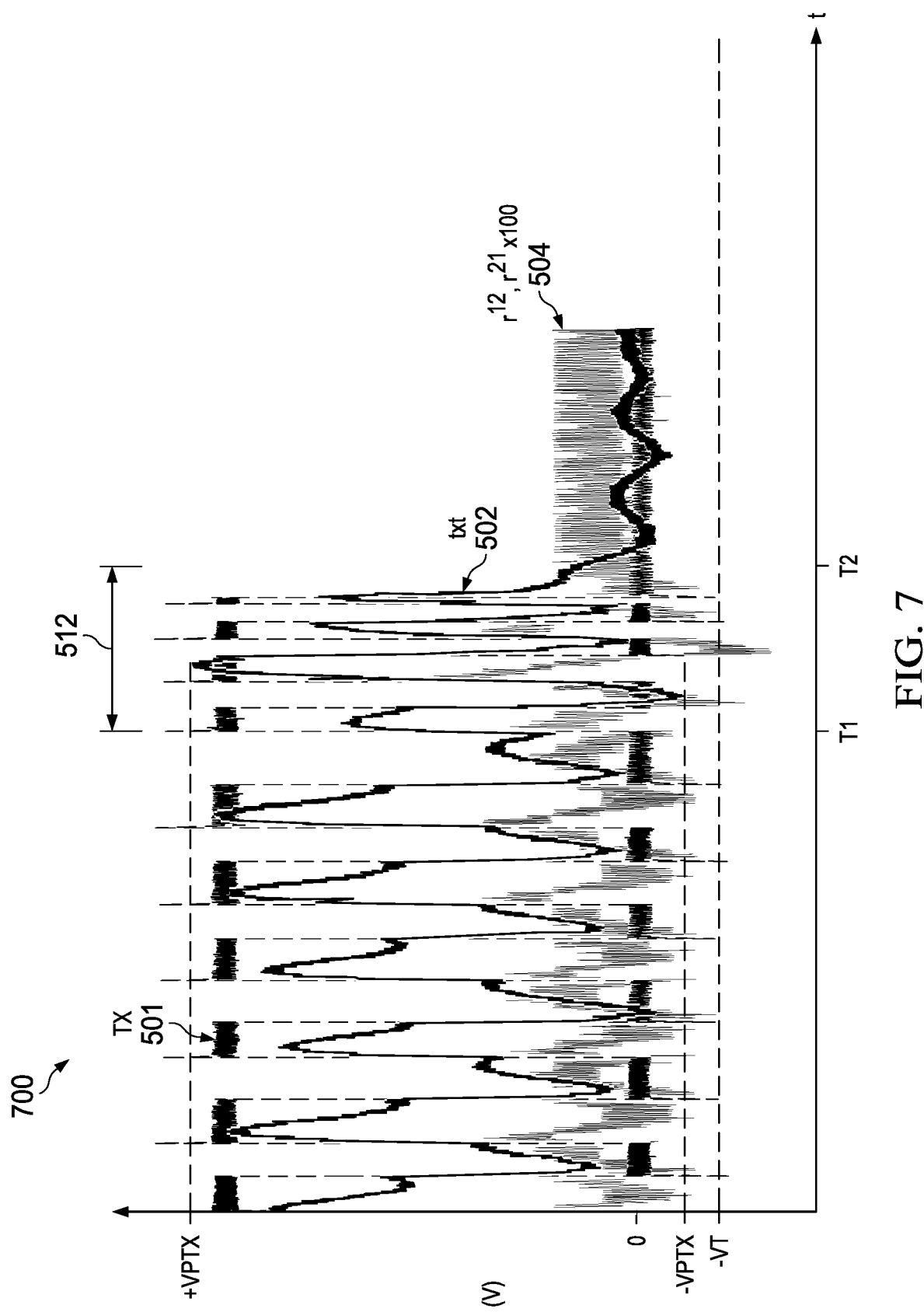
FIG. 7 is a signal diagram of transmit and receive signals for the end portion of the measurement cycle of FIG. 6.
Figure 8:
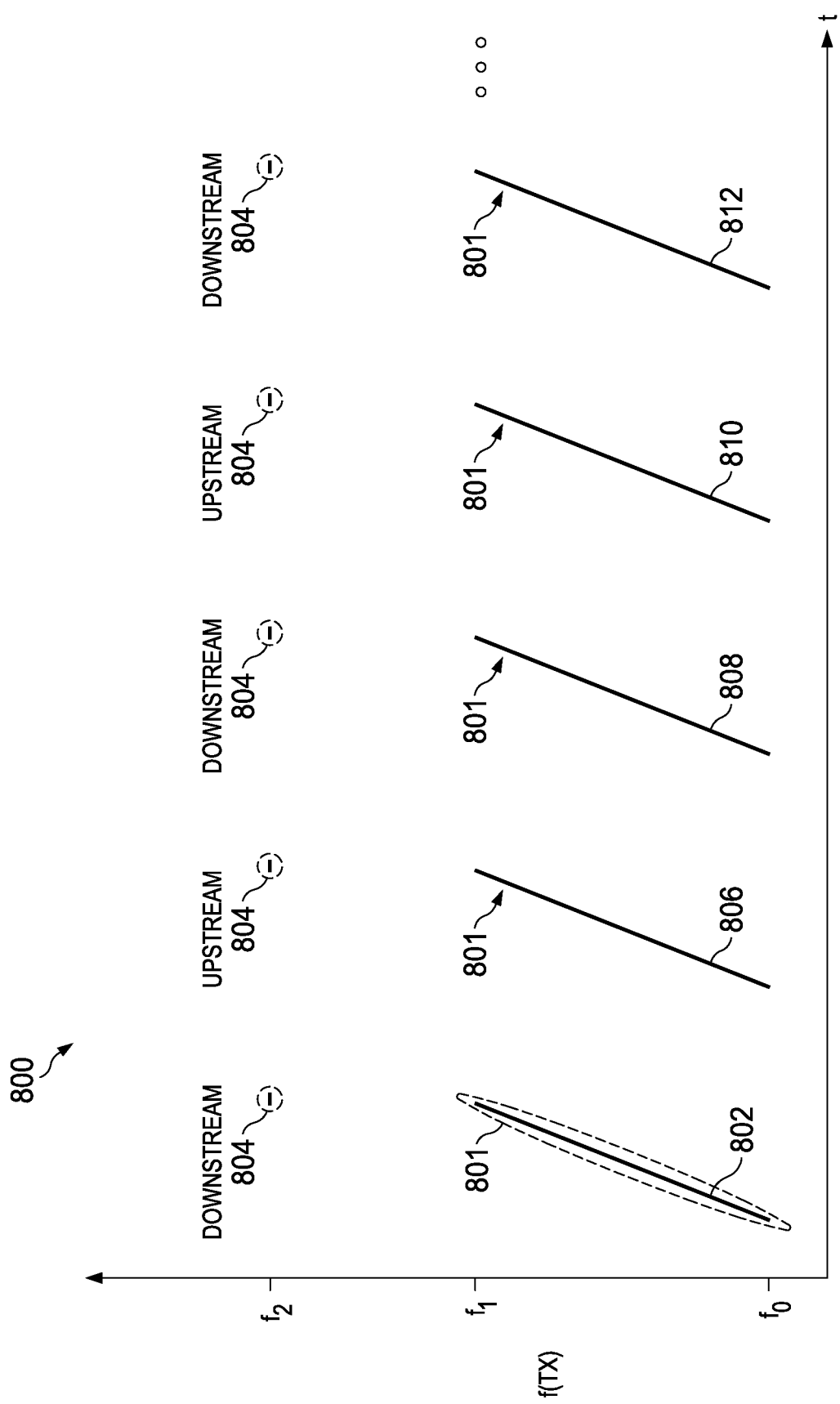
FIG. 8 is a frequency diagram of several example transmit chirp signals with out-of-band tail or end portions.

Referring also to FIGS. 6-8, FIG. 6 shows a signal diagram 600 including an example GPIO output TX signal 501, an example transmit signal 502 (e.g., txt) and an example receive signal 504 (e.g., $t_{12}$, $t_{21}$). FIG. 7 shows a signal diagram 700 that illustrates the transmit and receive signal curves 501, 502 and 504 for the end portion of the measurement cycle of FIG. 6. FIG. 8 provides a frequency diagram 800 showing several example transmit chirp signals (TX or txt) 802, 806, 808, 810 and 812 with upward frequency ramp first portions 801 and out-of-band tail or end (second) portions 804 (second portion 512). In this example, the processing circuit 106 modulates sequential bits from the GP I/O output 109 to create the TX signal with a first portion ramp followed by a higher frequency second portion of a significantly shorter duration. In this example, the first portion 510 has a duration greater than twice a duration of the second portion 512. As shown in FIG. 6, the transmit signals begin at the start frequency $f_0$ at time T0 and the frequency of the first portion 510 ramps up from the start frequency $f_0$ in the first frequency band $f_0$-$f_1$ to a higher end frequency $f_1$ in the first frequency band $f_0$-$f_1$, where the first portion 510 is completed at time T1. The second portion 512 begins at time T1 and ends at time T2. As seen in this example, the duration (T1-T0) of the first portion 510 is significantly longer than the duration (T2-T1) of the second portion 512.

In addition, the second frequency $f_2$ of the second portion 512 is significantly higher than the end frequency $f_1$. In this regard, the multi-portion transducer transmit signal txt 502 is distinct from a simple single-portion ramp, in that the second frequency $f_2$ of the second portion 512 is outside the first frequency band and different than the end frequency $f_1$. The second portion 512 provides an out-of-band transmit tuning sequence via intelligent modulation of the GPIO bits in the second tail or end portion of the upstream or downstream measurement cycle in the ultrasonic flow sensing system 100. In one non-limiting example, the first portion 510 of the transmit signals in the first frequency band $f_0$-$f_1$ include a ramp from $f_0$=120 kHz to $f_1$=200 kHz to provide a ramp or "chirp" first portion of the transmit signals. In another non-limiting example, the first portion 510 includes a ramp from $f_0$=360 kHz to $f_1$=440 kHz. In one example, the second frequency $f_2$ of the second portion 512 is outside the first frequency band, and outside the transducer frequency band. In one example, the second frequency $f_2$ can be as high as up to 500 kHz-4 MHz. In certain examples, the second frequency $f_2$ is generally constant in the second portion 512. In other examples, the second frequency $f_2$ changes during the second portion 512, for example, using a 16 bit second portion 512 with 4 pulses at I MHz and 2 pulses at 2 MHz.

Figure 9:
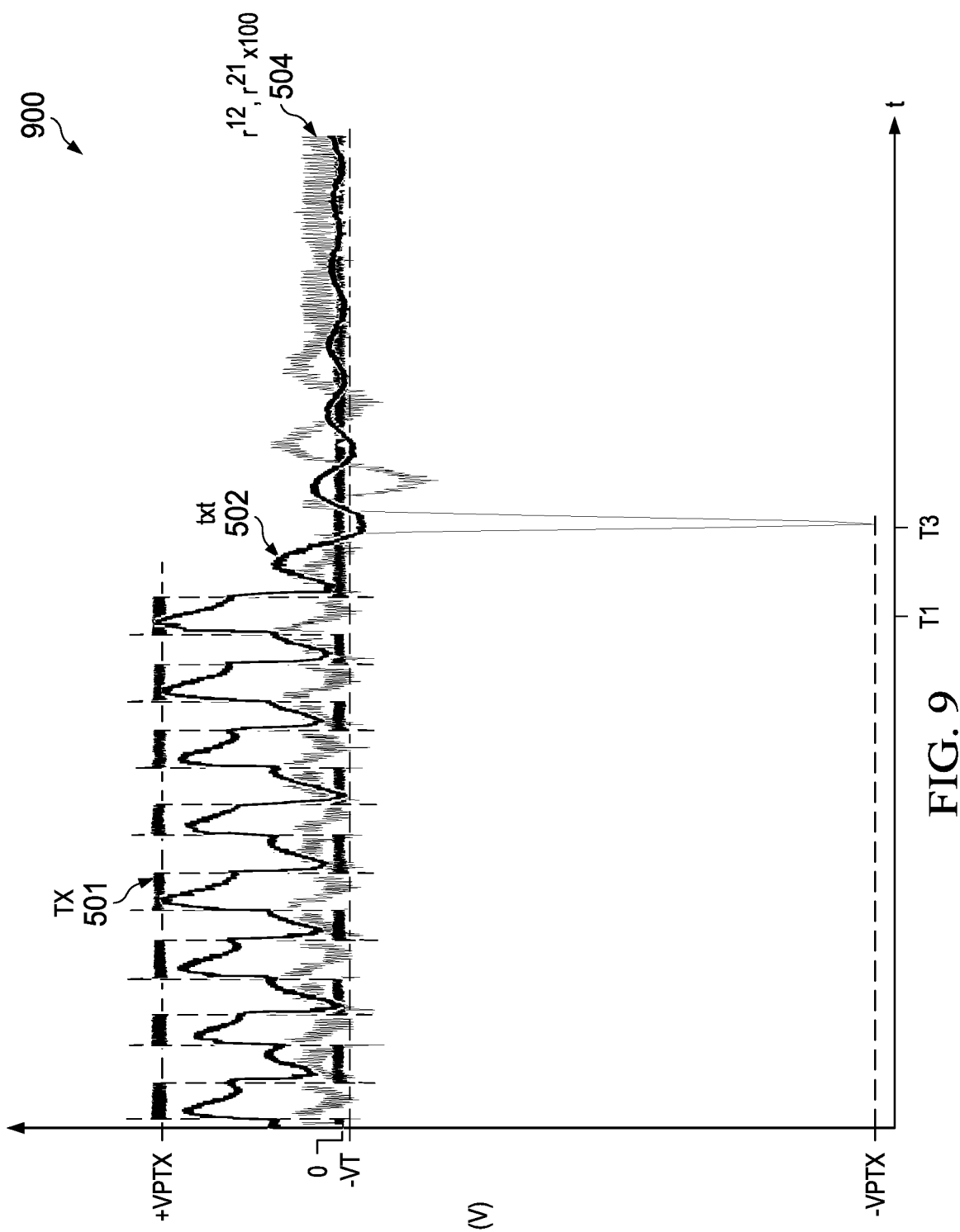
FIG. 9 is a signal diagram of transmit and receive signals with no out-of-band transmit tuning sequence for an end portion of a measurement cycle in an ultrasonic flow sensing system.

FIG. 9 is a signal diagram 900 that shows transmit and receive signals 501, 502 and 504 with no out-of-band transmit tuning sequence for an end portion of a measurement cycle in an ultrasonic flow sensing system. Instead, the signals in FIG. 9 abruptly terminate the transmit chirp at time T1 at the end frequency $f_1$ of the frequency band $f_0$-$f_1$. As previously noted, abrupt termination of the chirp transmission can lead to subsequent transmit transducer vibration. The transmit side driver is grounded, and the transducer vibration results in the voltage at the multiplexer going below zero, as seen in the significant negative voltage spike in the curve 504 at time T3 in FIG. 9. In this example, the TX signal during the transmit sequence has a positive maxima or voltage peak+VPTX as well as a negative voltage peak−VPTX. FIG. 9 further illustrates a negative voltage threshold−VT (e.g., approximately 400 mV) associated with the ESD protection circuit triggering threshold of the transmit multiplexer 120. With no tail end second portion in the example of FIG. 9, the abrupt termination of the transmit sequence at time T1 causes the transmit side multiplexer voltage to dip significantly below the threshold−VT at time T3. As discussed above, moreover, this ESD protection circuitry can create a large input signal (e.g., 40-50 mV) in the receive circuit, which can saturate the receive circuit amplifier 104 for a significant period of time (e.g., 40-50 μs), during which receive signal sampling and processing can be disturbed.

In contrast, where the second portions 512 of the transmit signals are employed as shown in FIGS. 6 and 7, the transmit side multiplexer voltage signal has a negative peak voltage−VPTX that remains above the ESD protection trigger or threshold voltage−VT. Accordingly, the methods and circuitry of the present disclosure advantageously mitigate or avoid the above-mentioned problems associated with abrupt termination of the ultrasonic flow sensor transmit signals. Certain disclosed examples advantageously insert the ending sequence in the second portion 512 which "detunes" the transmit transducer and reduces negative dips of the transducer thus avoiding false ESD circuit triggers. For an ultrasonic system using multiple square pulses for excitation, the first portion can either be a single sine wave excitation or a chirp over frequencies f0 to f1, and a final integer number N pulses during the second portion 512 are modulated outside of the first frequency band of $f_0$-$f_1$. In practice, the last 16 bits are allowed a flexible pattern, and the transmitter or processing circuit 106 can adapt the second portion 512 in any suitable manner to mitigate or reduce the multiplexer voltage dip and the associated likelihood of false ESD triggers and receive circuit surges. In certain implementations, the two-portion transmit signal generation can be implemented in software or firmware by processor-executed instructions stored in the memory 116 to implement the chirp and tuning component 110 in the example of FIG. 1. Moreover, the disclosed solutions avoid the addition of Schottky diodes or other techniques that could adversely lead to impedance mismatch between the transmit and receive circuitry. Further, the disclosed solutions are tunable or adjustable, and thus provide flexibility for different transducer operating frequencies in different applications. In addition, the disclosed techniques and circuitry are not limited to use only during ESD triggers, and provide a generic scheme where the decay is controlled by an end sequence 512.

FIG. 10 shows an example transducer response graph 1000 including a gain response curve 1002 for the example transducers $UT_1$ and $UT_2$ in FIG. 1. The example transducer frequency bandwidth 1004 in this example includes excitation frequencies for which the transducer gain response 1002 is within a non-zero predetermined value X dB of the peak transducer response gain PG. In certain implementations, X is 10, although not a strict requirement of all possible implementations. In this example, the transducer response curve 1002 is generally symmetrical about a center frequency $f_c$, although not a strict requirement of all possible implementations. In certain examples, the first frequency band 1006 of the transmit chirp signals is within the transducer bandwidth 1004, although not a requirement of all possible implementations. In certain examples, the first frequency band 1006 can be coextensive with the transducer bandwidth 1004, although not a strict requirement of all possible implementations. In the illustrated example of FIG. 10, the first frequency band 1006 is a subset of the transducer bandwidth 1004, in which the lower transducer bandwidth edge frequency $f_a$ is less than $f_0$, and the upper transducer bandwidth edge frequency $f_b$ is greater than $f_1$. FIG. 10 also shows an example in which the second frequency $f_2$ is outside (and well above) both of the transducer bandwidth 1004 and the first frequency band 1006.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The invention claimed is:

1. A system to measure fluid flow, comprising:
   first and second transducers spaced from one another to transmit and receive ultrasonic signals in a pipe, the first transducer including a first electrical terminal, and the second transducer including a second electrical terminal, the first transducer having a transducer frequency bandwidth for which a transducer response is within a non-zero predetermined value of a peak transducer response;
   a transmit circuit, including a transmit circuit output to provide a transducer transmit signal to the first electrical terminal based on a transmit pulse signal;
   a receive circuit, including a receive circuit input to receive a transducer receive signal from the second electrical terminal;
   an analog-to-digital converter (ADC) arranged to sample a receive signal from the receive circuit and provide a sampled signal; and
   a processing circuit, including an output to provide the transmit pulse signal to the transmit circuit, the transmit pulse signal including a first portion with a frequency in a first frequency band, and a second portion with a second frequency outside the first frequency band, the processing circuit configured to compute a transit time of ultrasonic signals travelling between the first and second transducers based on the sampled signal, the second frequency being outside the transducer frequency bandwidth.

2. The system of claim 1, further comprising a switching circuit operative in a first state to connect the transmit circuit output to the first electrical terminal of the first transducer, and to connect the receive circuit input to the second electrical terminal of the second transducer, the switching circuit operative in a different second state to connect the transmit circuit output to the second electrical terminal of the second transducer, and to connect the receive circuit input to the first electrical terminal of the first transducer.

3. The system of claim 2, wherein the frequency of the first portion ramps up from a start frequency in the first frequency band to a higher end frequency in the first frequency band, and wherein the second frequency of the second portion is different from the end frequency.

4. The system of claim 3, wherein the second frequency is greater than the end frequency.

5. The system of claim 4, wherein the second frequency of the second portion is constant.

6. The system of claim 3, wherein the first portion has a duration greater than twice a duration of the second portion.

7. The system of claim 1, wherein the non-zero predetermined value is 10 dB.

8. The system of claim 1, wherein the frequency of the first portion ramps up from a start frequency in the first frequency band to a higher end frequency in the first frequency band, and wherein the second frequency of the second portion is different from the end frequency.

9. The system of claim 1, wherein the first portion has a duration greater than twice a duration of the second portion.

10. The system of claim 1, wherein the second frequency of the second portion is constant.

11. The system of claim 1, wherein the frequency of the first portion is constant.

12. A flow sensor interface circuit, comprising:
a transmit circuit, including a transmit circuit output to provide a transducer transmit signal to a connected transmit transducer based on a transmit pulse signal;
a receive circuit, including a receive circuit input to receive a transducer receive signal;
an analog-to-digital converter (ADC) configured to sample a receive signal from the receive circuit, and to provide a sampled signal based on the receive signal; and
a processing circuit, including an output to provide the transmit pulse signal to the transmit circuit, the transmit pulse signal including a first portion with a frequency in a first frequency band, and a second portion with a second frequency outside the first frequency band, the second frequency being outside a transducer frequency bandwidth of the transmit transducer.

13. The flow sensor interface circuit of claim 12, further comprising a switching circuit operative in a first state to connect the transmit circuit output to a first transducer, and to connect the receive circuit input to a second transducer, the switching circuit operative in a different second state to connect the transmit circuit output to the second transducer, and to connect the receive circuit input to the first transducer.

14. The flow sensor interface circuit of claim 12, wherein the frequency of the first portion ramps up from a start frequency in the first frequency band to a higher end frequency in the first frequency band, and wherein the second frequency of the second portion is different from the end frequency.

15. The flow sensor interface circuit of claim 14, wherein the second frequency is greater than the end frequency.

16. The flow sensor interface circuit of claim 12, wherein the first portion has a duration greater than twice a duration of the second portion.

17. A method to measure fluid flow in a pipe, comprising:
providing a first transducer transmit signal to a first transducer, the first transducer transmit signal including a first portion with a frequency in a first frequency band, and a second portion with a second frequency outside the first frequency band, the second frequency being outside a transducer frequency bandwidth of the first transducer;
sampling a first transducer receive signal from a second transducer to generate a first sampled signal;
computing a first transit time representing transit of ultrasonic signals from the first transducer to the second transducer based on the first sampled signal;
providing a second transducer transmit signal to the second transducer, the second transducer transmit signal including the first portion with the frequency in the first frequency band, and the second portion with the second frequency outside the first frequency band;
sampling a second transducer receive signal from the first transducer to generate a second sampled signal;
computing a second transit time representing transit of ultrasonic signals from the second transducer to the first transducer based on the second sampled signal; and
computing a velocity of fluid flow in the pipe based on the first and second transit times.

18. The method of claim 17, wherein the frequency of the first portion ramps up from a start frequency in the first frequency band to a higher end frequency in the first frequency band, and wherein the second frequency of the second portion is different from the end frequency.

19. The method of claim 18, wherein the second frequency is greater than the end frequency.

20. The method of claim 17, wherein the first portion has a duration greater than twice a duration of the second portion.

* * * * *